United States Patent [19]

Adams et al.

[11] Patent Number: 5,132,166

[45] Date of Patent: Jul. 21, 1992

[54] SEMIRIGID LUGGAGE SHELL AND METHOD FOR ITS PRODUCTION

[75] Inventors: Ronald W. Adams; Gerald J. Smith, both of Auburn, Me.

[73] Assignee: Gates Formed-Fibre Products, Inc., Auburn, Me.

[21] Appl. No.: 622,123

[22] Filed: Dec. 3, 1990

Related U.S. Application Data

[63] Continuation of Ser. No. 233,942, Aug. 22, 1988, abandoned, which is a continuation-in-part of Ser. No. 90,808, Aug. 28, 1987, abandoned.

[51] Int. Cl.$^5$ .................. B32B 7/02; A45C 13/00; D04B 1/00

[52] U.S. Cl. .................. 428/212; 156/176; 156/181; 156/196; 156/228; 156/276; 190/125; 28/107; 16/169 R; 16/196; 428/68; 428/102; 428/111; 428/175; 428/197; 428/225; 428/234; 428/236; 428/246; 428/248; 428/250; 428/262; 428/263; 428/264; 428/265; 428/267; 428/284; 428/286; 428/287; 428/288; 428/289; 428/290; 428/296; 428/314.4; 428/364; 428/365

[58] Field of Search .............. 428/234, 282, 253, 286, 428/287, 300, 156, 174, 68, 76, 85, 102, 111, 114, 175, 197, 212, 225, 236, 245, 246, 248, 250, 262, 263, 264, 265, 267, 284, 288-290, 296, 314.4, 364, 365, 392-394, 492, 532; 190/123, 124; 156/60, 176, 181, 196, 228, 276; 264/136, 137; 28/107; 66/169 R, 170, 196

[56] References Cited

U.S. PATENT DOCUMENTS

| | | | |
|---|---|---|---|
| 4,061,817 | 12/1977 | Maxel | 428/246 |
| 4,350,727 | 9/1982 | Wald et al. | 428/102 |
| 4,673,615 | 6/1987 | Murphy et al. | 428/286 |

*Primary Examiner*—Ellis P. Robinson
*Assistant Examiner*—Donald J. Loney
*Attorney, Agent, or Firm*—J. L. Isaac; C. H. Castleman, Jr.; H. W. Oberg

[57] ABSTRACT

A resilient, low modulus, semirigid shell for use as a component of an article of luggage. The shell comprises a first nonwoven batt of thermoplastic resin fibers and an exterior material attached to the first nonwoven batt. The first batt and exterior material are thermally formed to a predetermined shape. The shell may also include one or more additional component layers selected from a second nonwoven, fibrous batt, a layer of backing material, a water impermeable film, and a lining material. In manufacturing the shell, the exterior material is attached to a first portion of a substrate material which is comprised of the nonwoven batt of thermoplastic resin fibers. A second portion of the substrate material is secured to an apparatus for thermal forming and the exterior material and substrate material are thermally formed to a resilient, low modulus, semirigid shell having a predetermined configuration.

46 Claims, 4 Drawing Sheets

SEMIRIGID LUGGAGE SHELL AND METHOD FOR ITS PRODUCTION

This is a continuation of pending U.S. patent application Ser. No. 07/233,942 which was filed on Aug. 22, 1988, abandoned which in turn is a continuation-in-part of U.S. patent application Ser. No. 07/090,808 which was filed on Aug. 28, 1987 abandoned.

BACKGROUND OF THE INVENTION

The present invention relates to a molded shell for luggage, and more particularly, to a relatively low modulus, resilient, semirigid luggage shell constructed of a thermally formed composite material which will give an article of luggage the appearance of high modulus, hard shell, molded luggage, yet allow it to be deformed and thereafter substantially return to its predetermined shape.

Two types of shells are conventionally employed in the construction of luggage. The first type is a relatively rigid, high modulus shell which traditionally was made of animal hides or canvas stretched over planar wooden members, and which is presently made of molded high modulus plastics that produce rigid, stiff, relatively heavy shells which are subsequently attached together by wooden or metal frameworks. Such rigid molded shells impart a relatively high degree of protection to items placed within an article of luggage constructed of the same but will be overstressed to fracture upon the application of a predetermined amount of force. In addition, an aesthetic fabric is extremely difficult to fixedly secure to the outer surface of such shells.

The second type of shell is a stitched-together assembly of relatively coarse, durable woven fabrics utilized to construct collapsible soft-sided luggage which is aesthetically pleasing. Examples of suitable fabrics are canvas (duck), either in a flat weave or a piled yarn weave, or other textiles woven out of either natural or synthetic fibers. However, the manufacture of soft-sided luggage by cutting and sewing several layers of fabric together is labor intensive.

Accordingly, a need exists for a shell suitable for the construction of luggage which is relatively light weight which possesses the aesthetic appearance of both rigid molded and soft-sided luggage shells, and which affords a relatively high degree of protection to items placed within such shells.

It is an object of the present invention to produce a luggage shell made of materials which are relatively soft and deformable and to produce a thermally formed shell having a low modulus and the appearance and silhouette of a rigid, injection-molded shell.

It is another object of the present invention to provide a method of constructing luggage in which a variety of exterior materials ranging from coarsely woven jute-like fabrics to nonwoven-backed, leather-like vinyl materials can be used.

Yet another object of the present invention is to provide for a luggage shell that has an aesthetically pleasing interior surface, which can be applied during or prior to molding the shell.

It is also an object of the present invention to provide a durable multi-layered, composite material for use in thermally formed luggage shells that is highly resistant to puncture, tear, or crushing and that is easy to clean.

A further object of the present invention to provide a luggage shell material which is impervious to moisture penetration, even if the exterior material used is a porous woven cloth-type material.

A still further object of the present invention is to provide a method of manufacturing a luggage shell which results in a sleek, seamless, smooth fitting exterior surface without bubbles or separations existing between the exterior material and any of the substrate materials.

Another object of the present invention is to provide a process which decreases the manual labor required to manufacture a semirigid luggage shell, and which produces a consistently high quality product having minimal or no workmanship defects.

Yet another object is to provide a manufacturing process for mass producing high quality semirigid luggage shells.

SUMMARY OF THE INVENTION

To achieve the foregoing and other objects, and in accordance with the purposes of the present invention, as embodied and broadly described herein, one characterization of the present invention comprises a resilient, low modulus, semirigid shell for use as a component of an article of luggage. The shell comprises a first nonwoven batt defining a first and a second face and an exterior material attached to the first face of the first nonwoven batt. The first nonwoven batt is comprised of thermoplastic resin fibers and together with said exterior material is thermally formed to a desired configuration. Such resilient, low modulus, semirigid shell comprises an improvement to an article of luggage of the type having at least one shell secured to a frame.

In another characterization of the present invention, a method of manufacturing a luggage shell is provided. The method comprises attaching an exterior material to a first portion of a substrate comprised of a nonwoven batt of thermoplastic resin fibers, releasably securing a second portion of the substrate to an apparatus for thermal forming and thermally forming the exterior material and the substrate to form a shell having a predetermined configuration. The resulant shell is resilient and semirigid and has a low modulus.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

THE DETAILED DESCRIPTION OF THE PREFERRED EMBODIMENTS

Figure 1:
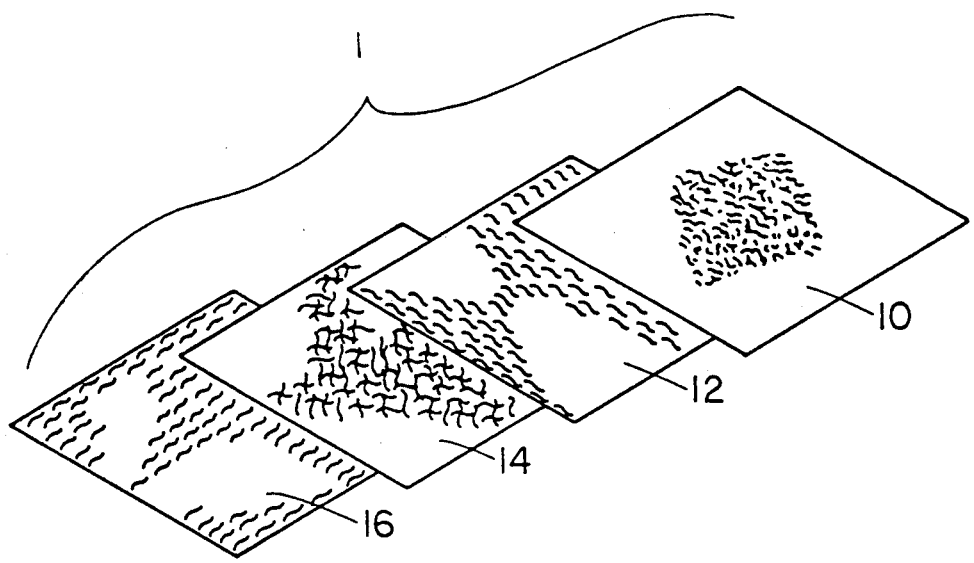
FIG. 1 is an exploded view of a composite material which can be thermally formed into an embodiment of the semirigid luggage shell of the present invention.

A composite material, which can be thermally formed into a resilient, low modulus, semirigid luggage shell in accordance with the present invention is illustrated generally as 1 in FIG. 1 and is comprised of an exterior material 10, a second batt of material 12, a first or core batt of material 14 and an interior lining material 16. Although four separate layers of a material are illustrated in FIG. 1, the molded luggage shell can be constructed of, an exterior material 10 and substrate material 18 (FIGS. 4 and 5) comprised of at least a core batt 14 which is capable of retaining the shape of a mold and which is capable of providing resiliency to the thermally formed luggage shell.

As utilized throughout this specification, the term "semirigid" refers to the characteristic of a luggage shell of the present invention to retain the shape and configuration into which the shell is thermally formed and to resist indentation upon the application of force thereto. As also utilized throughout this specification, the term "low modulus" refers to the property of shape retentive memory of a semirigid, resilient shell of the present invention which is thermally formed from a composite material in accordance with the present invention. The shape retentive memory of a shell of the present invention permits any such shell which has been indented to return to its original configuration or shape by itself or upon application of appropriate force depending upon the magnitude of indentation.

First or core batt of material 14 comprises a nonwoven batt of thermoplastic resin fibers. More preferably, first batt 14 will be comprised of at least a first and a second type of thermoplastic resin fibers having different temperature softening points. The thermoplastic resin fibers of first or core batt 14 can be fabricated into a nonwoven panel by interengaging and consolidating the otherwise loose fibers by the operation of needlepunching in a needle loom. This method is well known to those skilled in the art of nonwoven textiles, and is described in greater detail in the specification of U.S. Pat. No. 4,424,250, issued to Adams et al., the disclosure of which is incorporated herein by reference. Several different thermoplastic resin fibers are available for incorporation into such a nonwoven batt, including, but not limited to, fibers of polyethylene, polypropylene, polyester, nylons, polyphenylene sulfides, polyether sulfones, polyether-ether ketones or polybenzimidazoles. Preferably, at least a portion of the fibers chosen for core batt 14 are thermoplastic resin textile fibers which are capable of being heat softened at their melting point temperature and which can be subsequently rehardened to at least partially bond to each other upon being thermally formed so as to retain a predetermined desired shape. In addition to thermoplastic resin fibers, suitable nonthermoplastic fibers, such as fibers of rayon or other cellulosic materials, carbon fibers, glass fibers, aramid fibers, fibers of thermoset plastics or any other suitable nonthermoplastic fibers, can be incorporated into first or core batt 14.

Throughout this specification, the term "aramids" includes those aramid fibers derived from poly(m-phenyleneisophthalamide), i.e., Nomex ® a registered trademark of E. I. DuPont de Nemours, Co., and those derived from poly(p-phenyleneterephthalamide), i.e., Kevlar ® a registered trademark of E. I. DuPont de Nemours, Co. The term "nylons" includes those nylon fibers derived from the polyamide condensation product of hexamethylenediamine and adipic acid (i.e., Nylon 6,6) and those derived from the polycondensation of epsilon caprolactam (i.e., Nylon 6). The Phillips Petroleum Company manufactures and sells a suitable polyphenylene sulfide under the trademark of "Ryton".

A second or outer batt 12 may be comprised of any nonwoven material which can be fabricated into a layer, which can serve as an insulating or cushioning material, if necessary, and which can be attached to the core batt. The second or outer batt 12 may comprise any one of the thermoplastic resin fibers recited as being capable of use in the first or core batt 14, or the outer batt 12 may comprise fibers of rayon or other cellulosic materials, carbon fibers, glass fibers, aramid fibers, fibers of thermoset plastics, any other suitable fiber, or a closed cell foam material Second or outer batt 12 is preferably comprised of thermoplastic resin fibers, and more preferably, of thermoplastic resin fibers having a different temperature softening point than the thermoplastic fibers selected for the first or core batt 14. Preferably, the thermoplastic resin fibers of the outer batt 12 have a higher temperature softening point than the portion of thermoplastic resin fibers of the core batt 14 which are heat softened and rehardened upon thermal forming of the composite material The fibers of the second or outer batt 12 can be likewise interengaged and consolidated by the needlepunching method described above. After being prepared and consolidated, the first or core batt 14 and the second or outer batt 12 are attached together by any means known to the skilled artisan, such as fusion bonding, use of adhesives, or needlepunching. If the two batts are made substantially of fibers and are needlepunched together, it is particularly important that the fibers of outer batt 12 have a higher temperature softening point than a portion of the fibers making up the core batt 14, so that a plurality of bonds can be formed between the two batts after thermal forming of the composite material.

Figure 2:
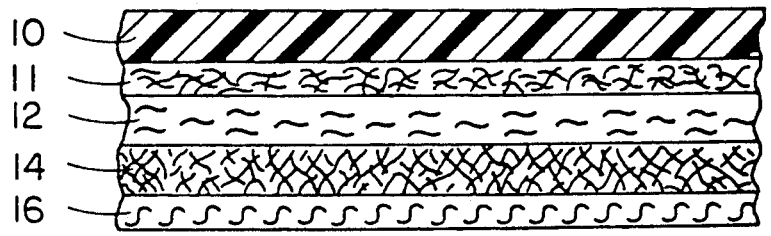
FIG. 2 is a cutaway, cross-sectional view of a composite material which can be thermally formed into an embodiment of the semirigid luggage shell of the present invention.

Exterior material 10 is preferably attached to the exterior side or face of the substrate material 18 which is comprised of at least first or core batt 14. If the substrate material 18 is comprised of a core and outer batt, exterior material 10 is preferably attached to that side or face of outer batt 12 which is opposite the side or face on which core batt 14 is attached. Although the exterior material can be chosen from a variety of materials, such as leather, plastic and nonwovens, preferably the exterior material 10 is a vinyl or a woven cloth chosen for aesthetic value of its outer surface and for the ability to be easily cleaned When vinyl or some other polymer is utilized as material 10, material 10 is preferably backed by a layer 11 of nonwoven material or spunlaced fabric. As illustrated in FIG. 2, the nonwoven backing material 11 can be made according to methods well known to those skilled in the art of preparing nonwoven materials. Exterior material 10 can either be attached to the nonwoven backing material 11 by an adhesive or by extruding the exterior material, for example, vinyl, directly onto backing material 11. If woven cloth 13 is used as exterior material 10 (see FIG. 3), woven cloth 13 can be made moisture impermeable by backing it with a layer of a water impermeable film 15. Film 15 can be a thin sheet, e.g. about 0.002 to about 0.010 inch thick, of any polymer which is flexible, durable, and resilient at ambient temperature, including natural rubber, synthetic rubber, and most thin thermoplastic films. Preferably, a linear low density polyethylene film is utilized as film 15 for its excellent durability.

Accordingly, exterior material 10 can be comprised of an outer surface material 10 or 13 and a backing 11 or 15 (FIGS. 2 and 3) and can be attached or secured to either a core batt 14 or an outer batt 12 by the use of an adhesive, by thermal fusing, or, in the case of certain fabric surface materials, by the use of a needle loom. When a water impermeable film 15 is employed as a backing, the use of an adhesive is preferred to avoid puncturing film 15. Alternatively, film 15 can be interposed between core batt 14 and outer batt 12 for further protection against the heat required for thermal forming in accordance with the present invention.

Figure 3:
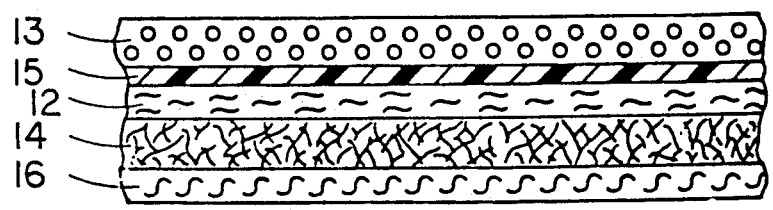
FIG. 3 is a cutaway, cross-sectional view of a composite material which can be thermally formed into an emodiment of the semirigid luggage shell of the present invention.

Interior lining material 16 can be attached or secured to the front face of substrate material 18 which is comprised of at least a core batt 14. As illustrated in FIGS. 2 and 3, the interior lining 16 can be directly secured to core batt 14, or if backing 15 is left off of the exterior material, the water impermeable film can be secured to both core batt 14 and interior lining material 16 so that the film is sandwiched therebetween. Interior lining material 16 can be made of a nonwoven, knit, or woven fabric and can be attached or secured in the manner described above by use of an adhesive, thermal fusing, or by needlepunching when not secured to composite including a water impermeable film 15.

Figure 4:
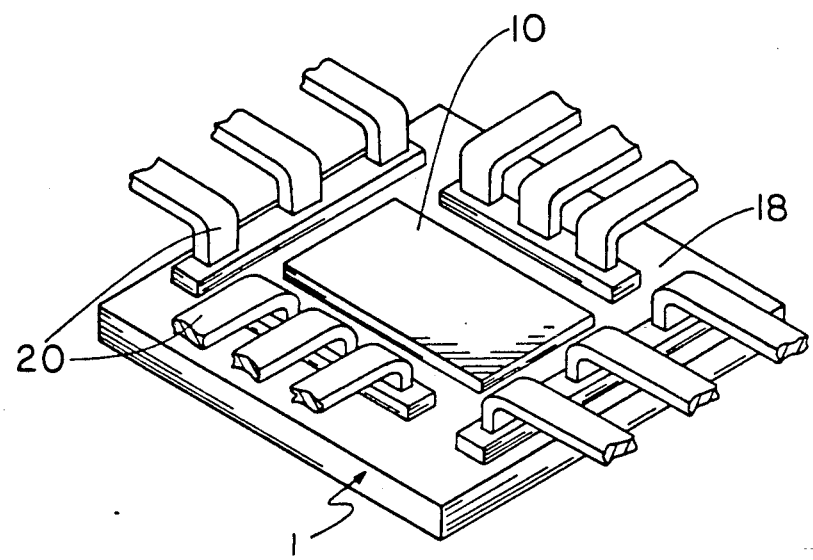
FIG. 4 is a perspective view showing a portion of a substrate material comprising a core batt of nonwoven material, with a portion of the exterior material adhered thereto, clamped by clamping means prior to a molding operation in accordance with the present invention.
Figure 5:
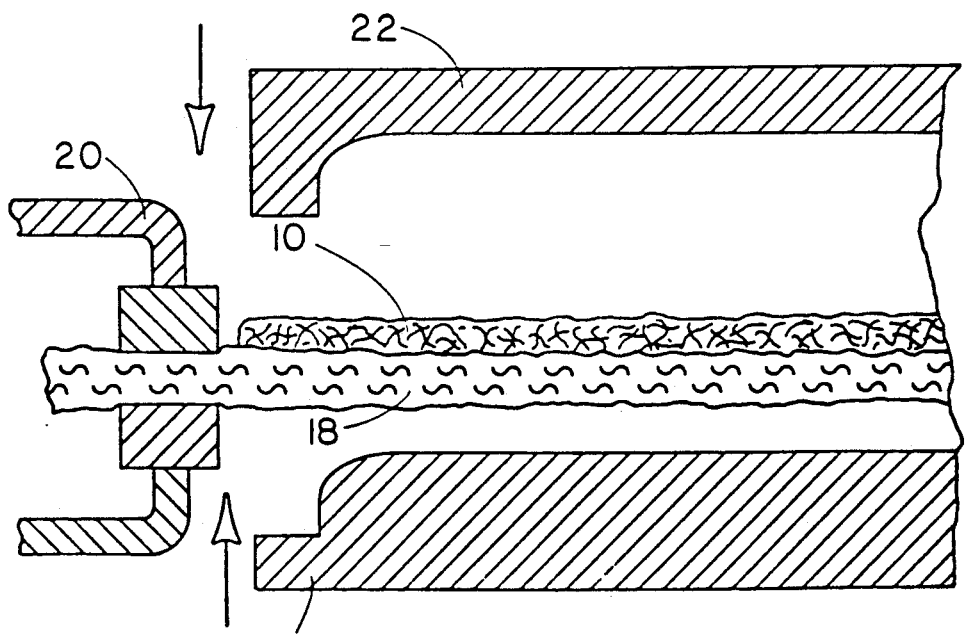
FIG. 5 is a partially cutaway, cross-sectional view showing a composite material which is clamped and which is positioned between mating molds prior to molding in accordance with the present invention.

The apparatus used to thermally form the composite material, as illustrated in FIGS. 1-3, into a semirigid luggage shell in accordance with the present invention is depicted generally in FIGS. 4 and 5. Turning first to FIG. 4, a preferred composite material 1, is illustrated clamped in clamping means 20 of a frame of an apparatus utilized for thermally forming materials (not illustrated). Exterior material 10 is sized to have an area smaller than the area of the underlying substrate material 18. Substrate material 18 is preferably a core batt of at least a first and second type of thermoplastic resin fibers interengaged and consolidated together. Accordingly, means 20 is clamped only to substrate material 18. Composite material 1 is heated to the softening point of at least a portion of the thermoplastic resin textile fibers of core batt 14 and is positioned between molds 22, 23 which are mated in the manner indicated in FIG. 5. Exterior material 10 is not clamped during the thermal forming operation to reduce internal tensile stresses created within exterior material 10 during molding between molds 22, 23, thereby resulting in a semirigid shell which has an exterior material 10 with a finished, sleek outer surface having no visible seams, protrusions, or pits. If the internal tensile stresses of exterior material 10 become to great during molding, the molded luggage shell will not properly retain its molded shape. The outer surface of exterior material 10 will be relatively smooth and seamless since exterior material 10 is permitted to fully conform to the contours of mold dies 22, 23.

Generally, the use of heat and pressure to thermally form certain materials into a predetermined configuration is well known to those skilled in the art. A material is first heated in any suitable means, for example, an oven, to the temperature softening point of at least a portion of the thermoplastic fibers incorporated therein. The softened fibers will adhere to each other and to surrounding fibers, and upon being subsequently cooled, the softened fibers will reharden so as to impart both a limited degree of rigidity and resiliency to the material in which they are incorporated, as well as cause the material to retain the configuration of the molds between which the material has been molded during thermal forming. After the thermal forming operation, excess substrate material would, to course, be trimmed away as scrap. Thus, in accordance with the present invention after the heated composite material has been shaped in a mold and cooled, a semirigid shell will result which, in its exterior appearance, is substantially identical to that of an injection molded high modulus plastic luggage shell.

The present invention also comprises a method for the manufacture of a low modulus, resilient, semirigid luggage shell. First, a substrate material 18 having a front and back face and comprised of first and second thermoplastic resin fibers is prepared. Again, preferably these are thermoplastic resin textile fibers which are interengaged and consolidated into a nonwoven core batt 14 by needlepunching. An outer batt 12 of some insulating-type material may be prepared and attached to the core batt. The outer batt is preferably a nonwoven fibrous material, such as thermoplastic resin textile fibers which have been interengaged and consolidated by needlepunching. However, the outer batt 12 can be made of any of the other materials mentioned above. The outer batt 12 and core batt 14 are most preferably attached to each other by needlepunching, thereby forming substrate material 18. Next, an exterior material 10 that has been cut to an area of size smaller than that of the substrate material 18 is secured to a face of the substrate material so that a portion of substrate material 18 does not have exterior material 10 secured thereto. As previously mentioned, the exterior material 10 can be secured or attached by use of an adhesive, by thermal bonding or by needlepunching. At the option of the manufacturer, the exterior material 10 can be prebacked with either a layer 11 of textile material, which is preferably a nonwoven textile material in the case of a vinyl exterior, or with a water impermeable film 15, which is preferably a linear low density polyethylene film when a woven cloth 13 is used as the exterior material 10.

Substrate material 18 is then clamped by a clamping means, for example, a frame of an apparatus used for thermal forming, such that only that portion of substrate material 18 which does not have exterior material 10 secured thereto is actually engaged in the clamping means. The assembly is then thermally formed under conditions of heat and pressure to first raise at least a portion of the thermoplastic resin textile fibers that are within core batt 14 to their temperature softening point. The softened fibers are allowed to reharden so that they at least partially bond to each other upon being subsequently cooled within the confines of the mold to retain a predetermined desired configuration to form a semirigid luggage shell.

An interior lining material 16, as illustrated in FIGS. 1-3, can be secured to a face of the substrate material 18

(FIGS. 4 and 5) before the heating step or during molding. If attached before heating, the interior lining material 16 will be cut to a size substanially identical to that of the substrate material 18 so that both the interior lining material and substrate material will be clamped in a clamping means (not illustrated). It is important that the interior lining material 16 be chosen to withstand temperatures necessary to soften at least one of the thermoplastic resin fibers of substrate material 18, for example, 350° F. If attached during molding, an adhesive coated liner material, for example, could be draped over lower mold 23 with the face of the liner material 16 which is coated with adhesive contacting one face of the substrate material 18 so that securing or attachment would take place after the molds 22, 23 close together to apply pressure to the entire composite material. In this instance, the interior lining material 16 will not be required to withstand temperatures approaching the softening point of thermoplastic resin fibers since the fibers are heated prior to attachment of liner material 16 and molding.

As an alternative, if it is desired that exterior material 10 be made without a water impermeable film 15, for example, where a second or outer batt 12 is not desired and thus the heating step may damage a film 15 secured before heating as explained herein, a water impermeable film 15 can be secured to the front face of the substrate material (not illustrated) and then an interior lining material 16 can be secured to film 15 during molding.

Figure 6:
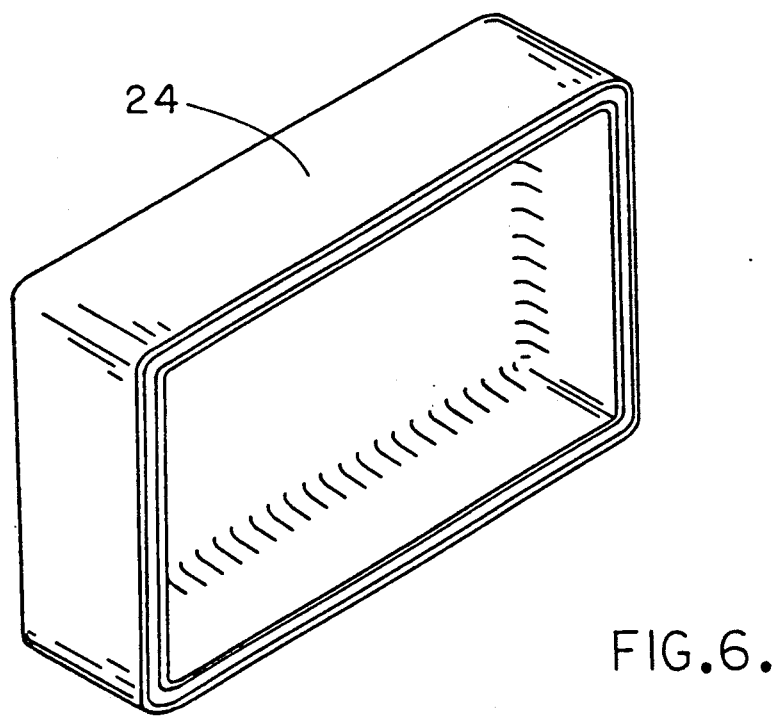
FIG. 6 is a perspective view of a semirigid luggage shell of the present invention.
Figure 7:
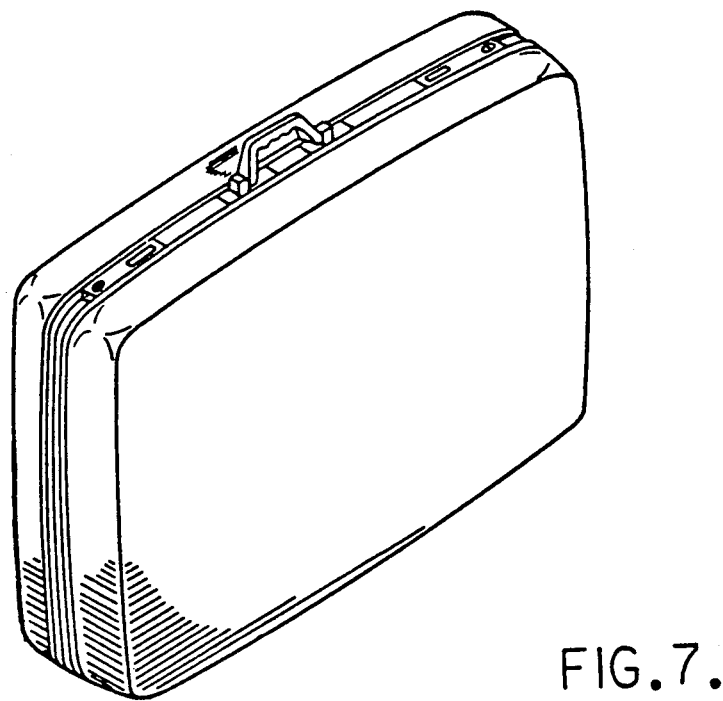
FIG. 7 is a perspective view of an assembled piece of luggage where semirigid luggage shells of the present invention have been installed in a frame means.

FIG. 6 illustrates the thermally formed, semirigid luggage shell 24. For certain components of exterior material, such as vinyl or a water impermeable film backing, the application of heat to composite material 1 should be controlled so that the material quality is not degraded For example, the heat radiated by an oven could be applied from the face of substrate material 18 to which exterior material 10 is not secured.

Figure 8:
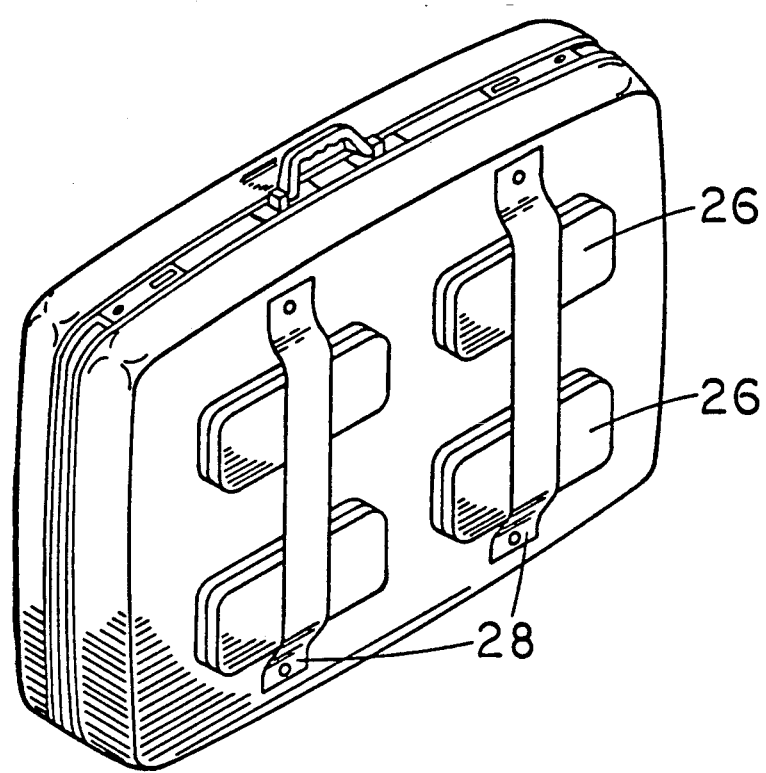
FIG. 8 is a perspective view of an article of luggage constructed of the semirigid luggage shells of the present invention and having a plurality of semirigid pods attached to the exterior of such shells.

As an added option, individual pods can be separately manufactured in accordance with the shell manufacturing methods disclosed herein. Such pods can be attached to the exterior of the primary luggage shell, as shown in FIG. 8 at 26. Attachment can be by any means known to those skilled in the art, such as the simple side strap arrangement 28 in FIG. 8. The pods increase the available storage space for the luggage, as they are each themselves smaller versions of the primary luggage shell, complete with their own frames, if necessary, and closures. The pods will generally be made of substantially the same materials as the primary shell, to achieve likewise appearance and form.

The following examples describe the manner and process of making and using the present invention and set forth the best mode contemplated by the inventors of carrying out the invention but are not to be construed as limiting the scope thereof.

EXAMPLE 1

A nonwoven batt of a 50—50 blend of polyester and polypropylene fibers was prepared having an overall weight of 20 ounces per square yard. A second batt of polyester fibers was prepared having an overall weight of 12 ounces per square yard. The first and second batt were needlepunched together and a liner material of spun woven cloth was adhesively attached to the backside of the polyester/polypropylene batt. An exterior material consisting of PVC vinyl that had been directly extruded onto an 8 ounce per square yard polyester nonwoven batt was then attached by adhesive to the 12 ounce per square yard polyester batt. This laminated material was then heated from the face on which the exterior material was not extruded for approximately 1.5-2 minutes to allow the polypropylene fibers which have the lower temperature softening point, to reach about 300° F. to soften. The material was placed immediately under pressure in a mold. Thereafter, the mold was opened and the shell was allowed to further cool for approximately 1.5-2 minutes. This produced a thermally formed luggage shell with an interior lining. Example sizes for molded shells include: 20×22 inches; 14×22 inches; or 12×14 inches.

EXAMPLE 2

Material was prepared as in Example 1, except that the exterior material consisted of a coarsely woven nylon cloth to which was adhesively bound a 0.006 inch thick film of linear low density polyethylene, which in turn was bound to the 12 ounce per square yard polyester batt.

EXAMPLE 3

Material was prepared as in Example 1, except that a 12 ounce per square yard polypropylene fiber batt was prepared by needlepunching and in turn needlepunched to the 20 ounce per square yard polyester/polypropylene batt.

EXAMPLE 4

Material is prepared according to the method of Example 1, except that a 16 ounce per square yard batt of a blend of polyester and polypropylene fibers is prepared and attached by needlepunching to the 20 ounce per square yard polyester/polypropylene batt.

EXAMPLE 5

Material is prepared as per Example 2, except that a nonwoven mat of fiberglass fibers is attached by needlepunching to the polyester/polypropylene batt.

EXAMPLE 6

Material is prepared according to Example 2, except that a 22 ounce per square yard batt of a 50—50 blend of polyphenylene sulfide fibers and Nomex brand of aramid fibers is used as the core batt.

EXAMPLE 7

Material is prepared according to Example 2, except that a 20 ounce per square yard blend of a 50—50 mix of polyethylene fibers and polyether-ether ketone fibers is prepared as the core batt.

EXAMPLE 8

Material is prepared in accordance with Example 1, except that an 18 ounce per square yard batt of a 50—50 blend of Nylon 6,6 fibers and polybenzimidazole fibers is used.

EXAMPLE 9

Material is prepared in accordance with Example 1, except that a 20 ounce per square yard batt of a 70-30 blend of Kevlar brand of aramid fibers and polyether sulfone fibers is prepared for use as the core batt.

EXAMPLE 10

Material is prepared in accordance with Example 2, except that the exterior material consists of a layer of 20 ounce per square yard batt of needled Kevlar brand aramid fibers, to which is adhesively bound a 0.006 inch thick form of linear low density polyethylene, which is in turn bound to the polyester batt.

EXAMPLE 11

Material is prepared in accordance with Example 2, except that the exterior material consists of a layer of a batt of 16 ounce per square yard knit Kevlar brand aramid fibers.

While the preferred embodiments have been fully described and depicted for the purpose of explaining the principles of the present invention, it will be appreciated by those skilled in the art that modifications, substantiations, and changes may be made thereto without departing from the scope of the invention set forth in the appended claims.

What is claimed is:

1. A resilient, low modulus, semirigid shell for use as a component of an article of luggage comprising:
   a first nonwoven batt comprised of interengaged and consolidated first fibers and second thermoplastic resin fibers having different melting points, said second thermoplastic fibers having a melting point sufficiently lower than that of said first fibers so as to soften during thermal forming and reharden upon subsequent cooling to form a plurality of bonds with said first fibers, and being present in an effective amount to form said bonds yet provide said low modulus upon thermoforming, said batt defining a first and a second face; and
   an exterior material attached to said first face of said first nonwoven batt, said first nonwoven batt and said exterior material being thermally formed to a deformable shell configuration having low modulus to provide shape retentive memory.

2. The shell of claim 1 wherein said first nonwoven batt is comprised of at least one type of thermoplastic resin fibers selected from the group consisting of fibers of polyethylene, polypropylene, polyester, nylons, polyphenylene sulfides, polyether sulfones, polyether-ether ketones, and polybenzimidazoles.

3. The shell of claim 1 wherein said first nonwoven batt is further comprised of fibers selected from the group consisting of rayon, cellulosic materials, carbon, aramids, glass, and thermoset plastics.

4. The shell of claim 1 further comprising:
   a second nonwoven, fibrous bat interposed and attached to said first nonwoven batt and said exterior material and being thermally formed with said first nonwoven batt and said exterior material to said shell configuration.

5. The shell of claim 4 wherein said second nonwoven, fibrous batt is comprised of at least one type of thermoplastic resin fibers interengaged and consolidated by needlepunching, selected from the group consisting of fibers of polyethylene, polypropylene, polyester, nylons, polyphenylene sulfides, polyether sulfones, polyether-ether ketones, and polybenzimidazoles.

6. The shell of claim 4 wherein said second nonwoven, fibrous batt is comprised of fibers selected from the group consisting of rayon, cellulosic materials, carbon, aramids, glass, and thermoset plastics.

7. The shell of claim 4 wherein said second nonwoven, fibrous batt is attached to said first nonwoven batt by an adhesive.

8. The shell of claim 4 wherein said second nonwoven fibrous batt is attached to said first nonwoven batt by an fusion bonding.

9. The shell of claim 4 wherein said second nonwoven fibrous batt is attached to said first nonwoven batt by needlepunching.

10. The shell of claim 9 wherein said second nonwoven, fibrous batt is comprised of interengaged and consolidated thermoplastic resin fibers having a higher temperature softening point than said portion of thermoplastic resin fibers of said first nonwoven batt.

11. The shell of claim 4 wherein said exterior material is a polymer and said shell further comprises:
   a layer of nonwoven material interposed between and attached to said exterior material and said second nonwoven, fibrous batt.

12. The shell of claim 11 wherein said exterior material is a vinyl.

13. The shell of claim 4 herein said exterior material is a woven cloth and said shell further comprises:
   a water impermeable film of a polymer which is flexible, durable, and resilient at ambient temperature interposed and attached to said exterior material and said second nonwoven, fibrous batt.

14. The shell of claim 13 wherein said polymer is selected from the group consisting of natural rubber, synthetic rubber, and thermoplastics.

15. The shell of claim 13 wherein said water impermeable film is a linear low density polyethylene film.

16. The shell of claim 4 further comprising:
   a water impermeable film of a polymer which is flexible, durable, and resilient at ambient temperature interposed and attached to said first nonwoven batt and said second nonwoven, fibrous batt.

17. The shell of claim 16 wherein said polymer is selected from the group consisting of natural rubber, synthetic rubber, and thermoplastics.

18. The shell of claim 16 wherein said water impermeable film is a linear low density polyethylene film.

19. The shell of claim 1 further comprising:
   a closed cell foam material interposed and attached to said first nonwoven batt and said exterior material and being thermally formed with said first nonwoven batt and said exterior material to said shell configuration.

20. The shell of claim 1 further comprising:
   a lining material secured to said second face of said first nonwoven batt, said lining material selected from the group consisting of a nonwoven fabric, a knit fabric, and a woven fabric.

21. The shell of claim 20 further comprising:
   a water impermeable film of a polymer which is flexible, durable, and resilient at ambient temperature interposed and attached to said lining material and said first nonwoven batt.

22. The shell of claim 21 wherein said polymer is selected from the group consisting of natural rubber, synthetic rubber, and thermoplastics.

23. The shell of claim 21 wherein said water impermeable film is a linear low density polyethylene film.

24. In an article of luggage having at least one shell, the improvement comprising:
   a resilient, low modulus, semirigid shell comprised of a first nonwoven batt defining a first and a second face and an exterior material attached to said first face of said first nonwoven batt, said first nonwoven batt comprised of interengaged and consolidated first fibers and second thermoplastic resin fibers having different melting points, said second thermoplastic fibers having a melting point sufficiently lower than that of said first fibers so as to soften during thermal forming and reharden upon subsequent cooling to form a plurality of bonds with said first fibers, said second fibers being present in an effective amount to form said bonds yet provide said low modulus, and said first nonwoven batt and said exterior material being thermally formed to a deformable shell configuration having low modulus to provide shape retentive memory.

25. The improvement of claim 24 wherein said first nonwoven batt is comprised of at least one type of thermoplastic resin fibers selected from the group consisting of fibers of polyethylene, polypropylene, polyester, nylons, polyphenylene sulfides, polyether sulfones, polyether-ether ketones, and polybenzimidazoles.

26. The improvement of claim 24 wherein said first nonwoven batt is further comprised of fibers selected from the group consisting of rayon, cellulosic materials, carbon, aramids, glass and thermoset plastics.

27. The improvement of claim 24 wherein said resilient, low modulus, semirigid shell further comprises:
a second nonwoven, fibrous batt interposed and attached to said first nonwoven batt and said exterior material and being thermally formed with said first nonwoven batt and said exterior material to said shell configuration.

28. The improvement of claim 27 wherein said second nonwoven, fibrous batt is comprised of at least one type of thermoplastic resin fibers interengaged and consolidated by needlepunching, selected from the group consisting of fibers of polyethylene, polypropylene, polyester, nylons, polyphenylene sulfides, polyether sulfones, polyether-ether ketones, and polybenzimidazoles.

29. The improvement of claim 27 wherein said second nonwoven, fibrous batt is comprised of fibers selected from the group consisting of rayon, cellulosic materials, carbon, aramids, glass, and thermoset plastics.

30. The improvement of claim 27 wherein said second nonwoven, fibrous batt is attached to said first nonwoven batt by an adhesive.

31. The improvement of claim 27 wherein said second nonwoven fibrous batt is attached to said first nonwoven batt by an fusion bonding.

32. The improvement of claim 27 wherein said second nonwoven fibrous batt is attached to said first nonwoven batt by needlepunching.

33. The improvement of claim 32 wherein said second nonwoven, fibrous batt is comprised of interengaged and consolidated thermoplastic fibers having a higher temperature softening point than said portion of thermoplastic resin fibers of said nonwoven batt.

34. The improvement of claim 27 wherein said exterior material is a polymer and said resilient, low modulus, semirigid shell further comprises:
a layer of nonwoven material interposed between and attached to said exterior material and said second nonwoven, fibrous batt.

35. The improvement of claim 34 wherein said exterior material is a vinyl.

36. The improvement of claim 27 wherein said exterior material is a woven cloth and said resilient, low modulus, semirigid shell further comprises:
a water impermeable film of a polymer which is flexible, durable, and resilient at ambient temperature interposed and attached to said exterior material and said second nonwoven, fibrous batt.

37. The improvement of claim 36 wherein said polymer is selected from the group consisting of natural rubber, synthetic rubber, and thermoplastics.

38. The improvement of claim 36 wherein said water impermeable film is a linear low density polyethylene film.

39. The improvement of claim 27 wherein said resilient, low modulus, semirigid shell further comprises:
a water impermeable film of a polymer which is flexible, durable, and resilient at ambient temperature interposed and attached to said first nonwoven batt and said second nonwoven, fibrous batt.

40. The improvement of claim 39 wherein said polymer is selected from the group consisting of natural rubber, synthetic rubber, and thermoplastics.

41. The improvement of claim 39 wherein said water impermeable film is a linear low density polyethylene film.

42. The improvement of claim 24 wherein said resilient, low modulus, semirigid shell further comprises:
a closed cell foam material interposed and attached to said first nonwoven batt and said exterior material and being thermally formed with said first nonwoven batt and said exterior material to said shell configuration.

43. The improvement of claim 24 wherein said resilient, low modulus, semirigid shell further comprises:
a lining material secured to said second face of said first nonwoven batt, said lining material selected from the group consisting of a nonwoven fabric, a knit fabric, and a woven fabric.

44. The improvement of claim 43 wherein said resilient, low modulus, semirigid shell further comprises:
a water impermeable film of a polymer which is flexible, durable, and resilient at ambient temperature interposed and attached to said lining material and said first nonwoven batt.

45. The improvement of claim 44 wherein said polymer is selected from the group consisting of natural rubber, synthetic rubber, and thermoplastics.

46. The improvement of claim 44 wherein said water impermeable film is a linear low density polyethylene film.

* * * * *